Dec. 21, 1965     A. HUBER     3,224,292
LOCKING DEVICE FOR A MOTOR VEHICLE ACCELERATOR PEDAL
Filed Dec. 5, 1963
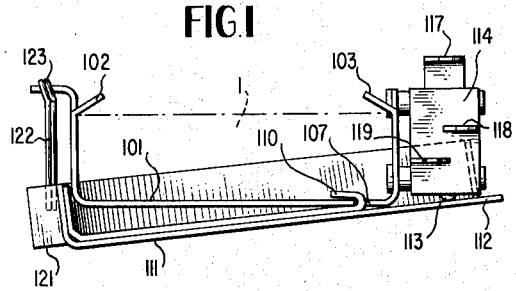
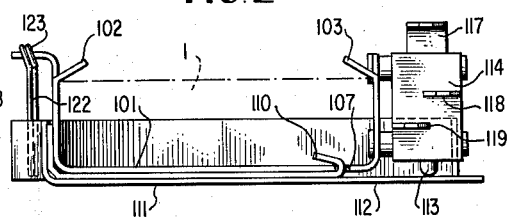
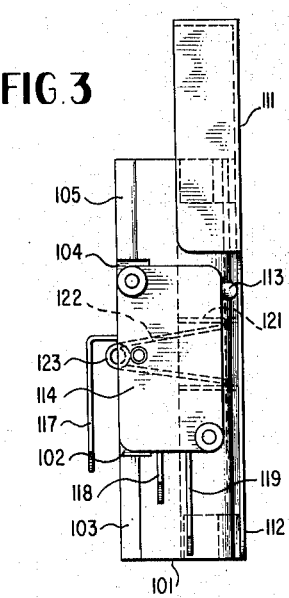
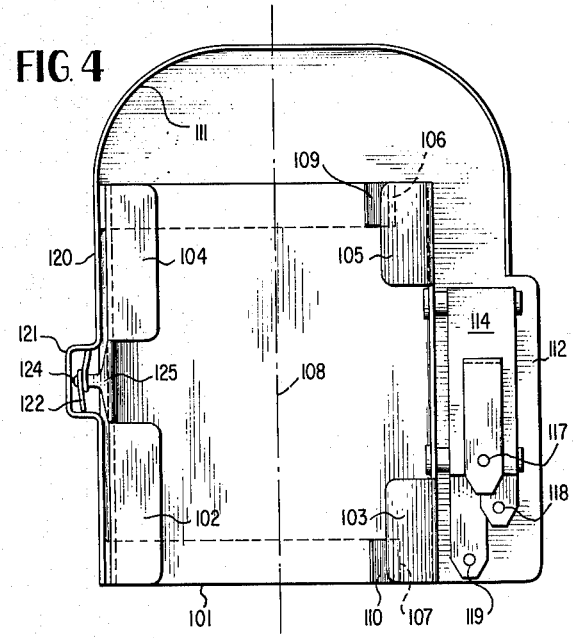
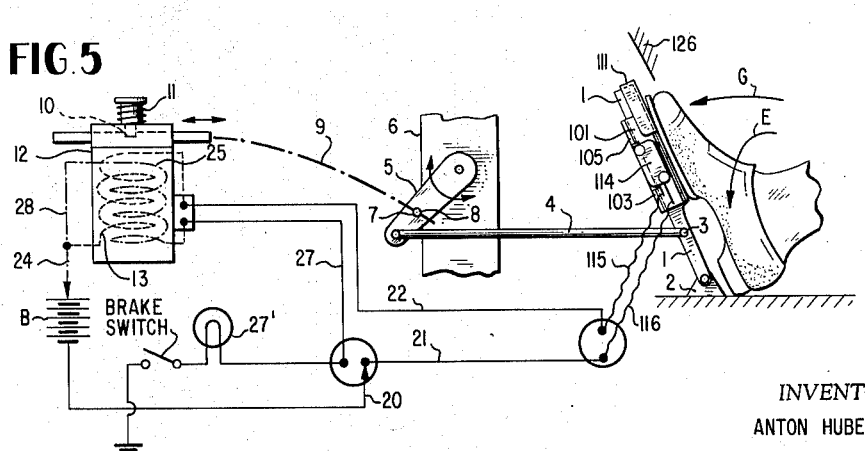
INVENTOR.
ANTON HUBER
BY
Rupert J. Brady
ATTORNEY

United States Patent Office 3,224,292
Patented Dec. 21, 1965

3,224,292
LOCKING DEVICE FOR A MOTOR VEHICLE ACCELERATOR PEDAL
Anton Huber, Dietramszeller Str. 8, Bad Toelz, Bavaria, Germany
Filed Dec. 5, 1963, Ser. No. 328,412
Claims priority, application Germany, Dec. 6, 1962, H 47,605
6 Claims. (Cl. 74—513)

The invention relates broadly to controlling devices for accelerator pedals and more particularly to devices for locking the accelerator pedals of gas powered motor vehicles in selected position by electrical means.

In operating a motor vehicle it is a frequent complaint that the driver's foot becomes fatigued by holding the accelerator pedal at a certain position for a prolonged period to maintain the speed of the vehicle.

It is therefore an object of this invention to provide a new and useful device for locking the accelerator pedal of a motor vehicle at any desired position.

Another object of the invention is to provide a simple inexpensive means attachable to any design of accelerator pedal for maintaining the position of the pedal constant.

Another object of the invention is to provide such a device which utilizes the electrical power of the battery of the vehicle.

Still another object of the invention is to provide a construction of accelerator pedal lock which avoids any new technique or method to be learned by the driver of the vehicle in its operation, and which does not interfere with the normal accustomed operation of the automobile.

A further object of the invention is to provide such a device which is completely safe and reliable.

Other and further objects of the invention will be evident to those skilled in this particular art from the specification hereinafter following.

These objects are carried out by the below described embodiment of the invention, consisting in the construction, arrangement and combination of the various parts of the device set forth fully and specifically pointed out in the claims of the specification hereinafter following and illustrated in the accompanying drawings in which:

FIG. 1 is an end elevational view of the locking device showing the switch in closed position;

FIG. 2 is a view similar to FIG. 1 but showing the switch in the open position;

FIG. 3 is a side plan view of the accelerator pedal switch;

FIG. 4 is a bottom plan view of the accelerator pedal switch; and

FIG. 5 is a reduced scale schematic diagram of the complete locking device showing the various parts arranged and connected in electrical circuit.

Referring to the figures in greater detail the numerals will designate the parts in sequence as the description progresses. Reference numeral 1 represents the standard gas or accelerator pedal of any motor vehicle as it is known, usually pivotally mounted on a bearing block 2 attached to the floor of the vehicle. Reference numeral 3 designates the pivotal connection point of rod 4 with the gas pedal, which rod connects the gas pedal 1 with the throttle link 5 of the carburetor 6. At the aperture 7 of the link 5 a cable-end 8, of a flexible cable 9, of well known type such as a Bowden cable is fastened making a flexible connection between the link 5 a slide bar attached to and positioned on one end of an electromagnet 12. An iron shim or clamping member 10 is placed on top of the rod and has a return spring 11 attached thereto designed to pull back shim 10 when the coil or core of the electromagnet 12 is deenergized. Coil 13 of electromagnet 12 is supplied current from battery B of the vehicle through the lines 20, 21, 22 and 24, and pulls clamping member 10 downwardly into firm abutment with the slide bar at the end of cable 9 to frictionally clamp the slide bar in its set position. Despite the energization of coil 13 by the accelerator pedal switch, the slide bar at the end of cable 9 is released from the clamped position when the driver of the vehicle operates a second but oppositely wound electromagnet coil 25. This coil is connected to be energized by current from battery B by means of lines 27 and 28 each time the brakes are operated to energize brake light 27′. Thus this coil is connected into the brake light line and acts as a safety feature to neutralize the clamping action of coil 13 by establishing an equal and opposite magnetic field to release clamping member 10 from engagement with the slide bar.

A base plate 101 is fitted over the upper end of the vehicle gas or accelerator pedal 1 and is held securely thereon by flanges or side plates 102, 103, 104 and 105. Slots 106 and 107 of the base plate 101 are parallel with the longitudinal center line 108 of the base plate 101 but are offset laterally with respect thereto. These slots are loosely engaged by lugs 109 and 110, bent upon themselves, of an auxiliary pedal 111, overlying base plate 101, such that the auxiliary pedal can be pivotally tilted about slots 106 and 107 so that the edge 112 of the auxiliary pedal engages and actuates the button 113 of a pressure switch 114, by pushing the same inwardly, when the foot of the driver engaging the auxiliary pedal 111 is turned slightly inwardly, that is, when the driver imparts a lateral tilting movement to his foot, directed toward the inner side of the foot as indicated in FIG. 5 by arrow E.

In the laterally tilted position of the auxiliary pedal 111, as shown in FIG. 1, current will flow from the line 21 (FIG. 5) through the movable lines 115 and 116, which are connected in known manner to the soldering lugs 117, 118 and 119 of the pressure switch 114, through line 22, coil 13 and line 24, to energize coil 13 and pull in clamping member 10 to lock the pedal 1 in the set position.

In order to keep the auxiliary pedal 111 in position to maintain the switch 114 closed even when the driver removes his foot completely from the gas pedal, an outwardly extending wall portion 121 is provided in the down turned flange on the other side 120 of the auxiliary pedal 111, in which the diverging legs of a side spring 122 are held compressed in friction engagement with said wall portion. The ring-shaped part 123 of the side spring 122 is held by a lug 124 at the end of a tongue 125 connected to the base plate 101, so that in any position of the auxiliary pedal 111 the free ends of the side spring bear on both sides of the wall portion 121 producing a friction engagement therebetween which maintains the auxiliary pedal 111 in any set position with respect to the plate 101, even though the driver's foot is removed.

When gas is supplied in the usual manner, by pressing the foot directly forward in the direction of the arrow G (FIG. 5), with no tilting motion, the auxiliary pedal 111 is returned at the same time from the position shown in FIG. 1 to the position shown in FIG. 2 so that the energization current to the coil 13 of electromagnet 12 is interrupted and the slide bar at the end of the Bowden cable 9 is released by clamping member 10. From then on gas may be supplied in the conventional manner at the discretion of the driver.

If the accelerator pedal start-stop switch device according to the invention is left in the closed position, as shown in FIG. 1, so that a constant gas supply is ensured, or if a malfunction in the switch causes a steady supply of gas, if the brake pedal is pressed under these conditions, the normal brake light is energized, and as already described, a counter-current is supplied over lines 27, and 28 through coil 25 of the electromagnet 12 producing a magnetic field equal and counter to that of coil 13 so that the electromagnet 12 is ineffective, despite the current flowing through both windings. The field coil 13 is made ineffective and the clamping member 10 is pushed outwardly by the return spring 11 into the release position, freeing the slide rod connected with the linkage of the carburetor throttle by means of cable 9, and allowing the gas pedal to return automatically by its own return spring (not shown) into the zero or normal position. The auxiliary pedal 111 is returned to the deenergized position of FIG. 2 automatically by abutting a fixed stop 126 as the gas pedal 1 returns to its zero position, so that, the entire arrangement represented in FIG. 5 is normally currentless and back to the deenergized state by the time the brake pedal has been released. There are a number of other possibilities available from which to obtain the deenergization signal for the operation of the device of the invention beside the given example of the brake light described above. Among them may be mentioned a connection to the dimmer light switch, the windshield wiper switch or other switches on the dash board for other existing circuits which use a separate push button switch, hand lever, etc., already known in the art and existing in the vehicle. The given example is only for illustration and not for limitation of the invention in any respect.

While the invention has been shown and described in a preferred embodiment it is realized that modifications can be made and it is to be understood that no limitations on the invention are intended other than those imposed by the scope of the appended claims.

What I claim is:

1. A locking device for the accelerator pedal associated linkage of motor vehicles comprising, an electromagnet having a movable locking member for retaining the accelerator pedal linkage in set position, first and second windings in said electromagnet, a body portion adapted for connection to the upper end of an accelerator pedal, an auxiliary pedal connected for lateral tilting movement on said body portion about a longitudinal axis, a spring biased switch connected to energize said first winding and connected to said body portion and adapted to be closed by said auxiliary pedal upon unilateral tilting thereof thus locking the accelerator pedal linkage in selective position, a friction spring connected between said body portion and auxiliary pedal to retain the same in respective position against the action of said spring biased switch, said second winding wound opposite to said first winding, and second switch means connected to energize said second winding to nullify the action of said first energized winding and return the accelerator pedal to the normal position.

2. In a motor vehicle a position holding device for the accelerator pedal comprising, an electromagnet having two separate windings which when energized produce equal but counter magnetic fields, a body portion, a switch connected on said body portion and electrically connected to supply current to one of said electromagnet windings when closed, said body portion adapted for connection to the accelerator pedal, a plate pivotally connected to said body portion and adapted to be engaged by the operator's foot and moved thereby to close said switch thereby energizing said one electromagnet coil, spring means connected between said body portion and said plate for retaining said plate in pivoted position to maintain said switch closed when the operator's foot is removed from said plate, a linkage movable with the accelerator pedal extending adjacent said electromagnet, a movable member on said electromagnet adapted to clamp said linkage in set position on energization of said one winding, and a second switch means connected to the other electromagnet winding and adapted to energize the same to render ineffective the effects of the said one winding.

3. A device as set forth in claim 2 in which said spring means comprises a V-shaped spring element having arms biased away from each other.

4. A device as set forth in claim 2 in which said spring means is connected to one side of said body portion and extends substantially normal to the plane of said body portion and the plane of the accelerator pedal.

5. A device as set forth in claim 2 in which said spring means and said switch are connected on opposite sides of said body portion.

6. A device as set forth in claim 2 in which said plate is pivotally connected to said body portion adjacent one longitudinal edge of the body portion, and said spring means is connected between said plate and body portion adjacent the opposite longitudinal edge of said body portion.

References Cited by the Examiner

UNITED STATES PATENTS

| 1,820,272 | 8/1931 | Gumpper | 192—3 |
| 2,822,902 | 2/1958 | Glick | 192—3 |
| 2,831,367 | 4/1958 | Reilly | 192—3 |

FOREIGN PATENTS 1,217,634  12/1959  France.

DAVID J. WILLIAMOWSKY, *Primary Examiner.*